UNITED STATES PATENT OFFICE.

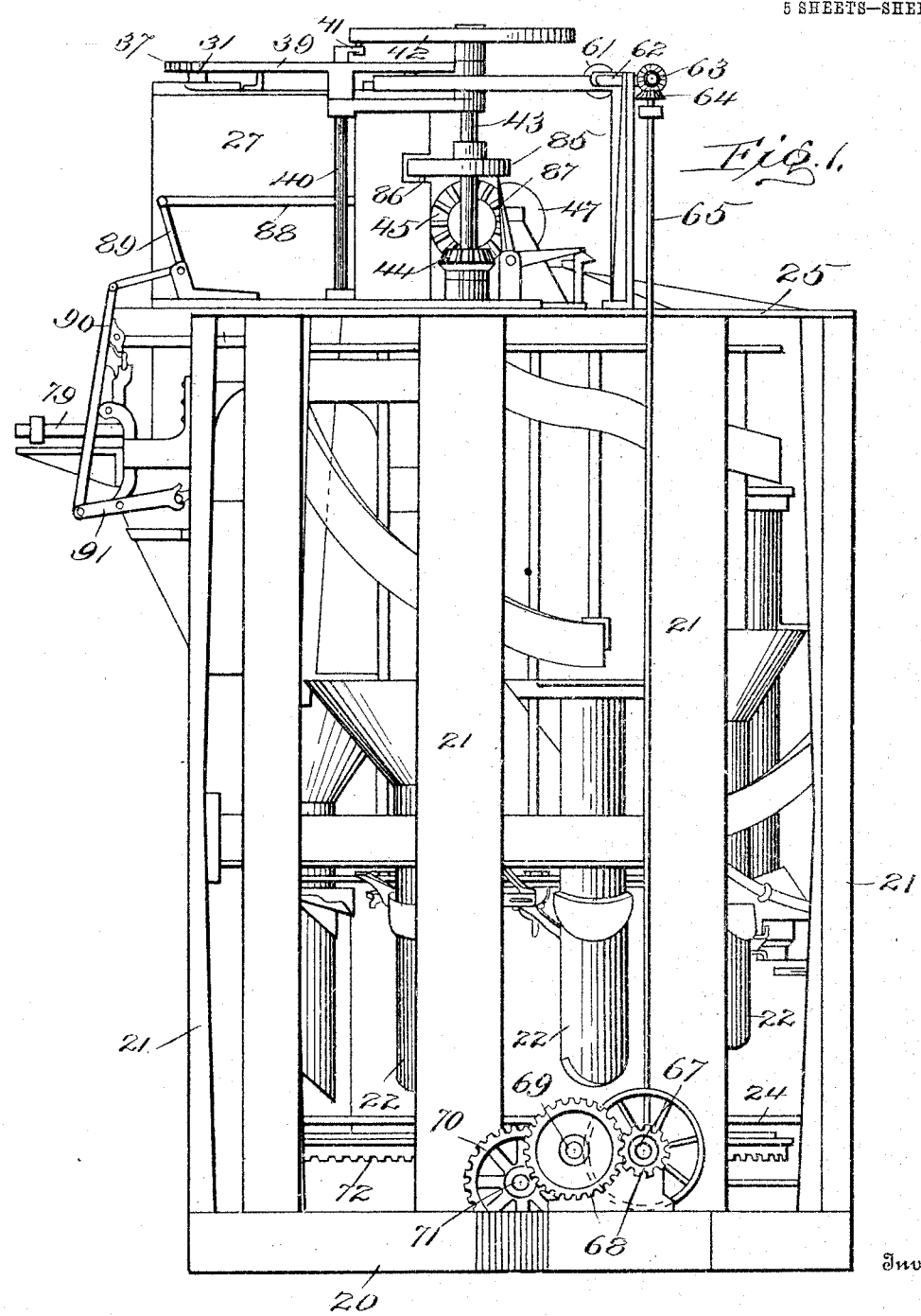

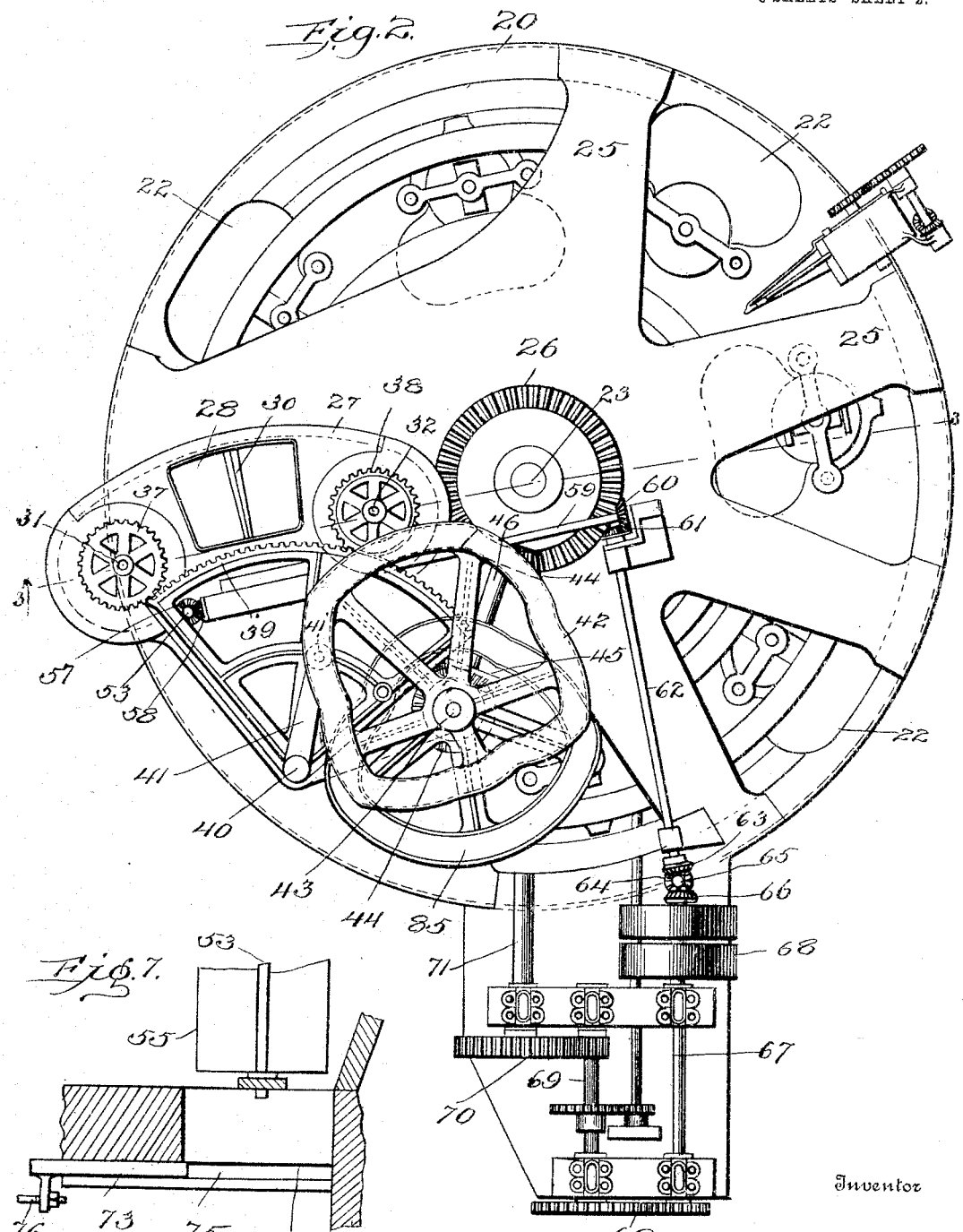

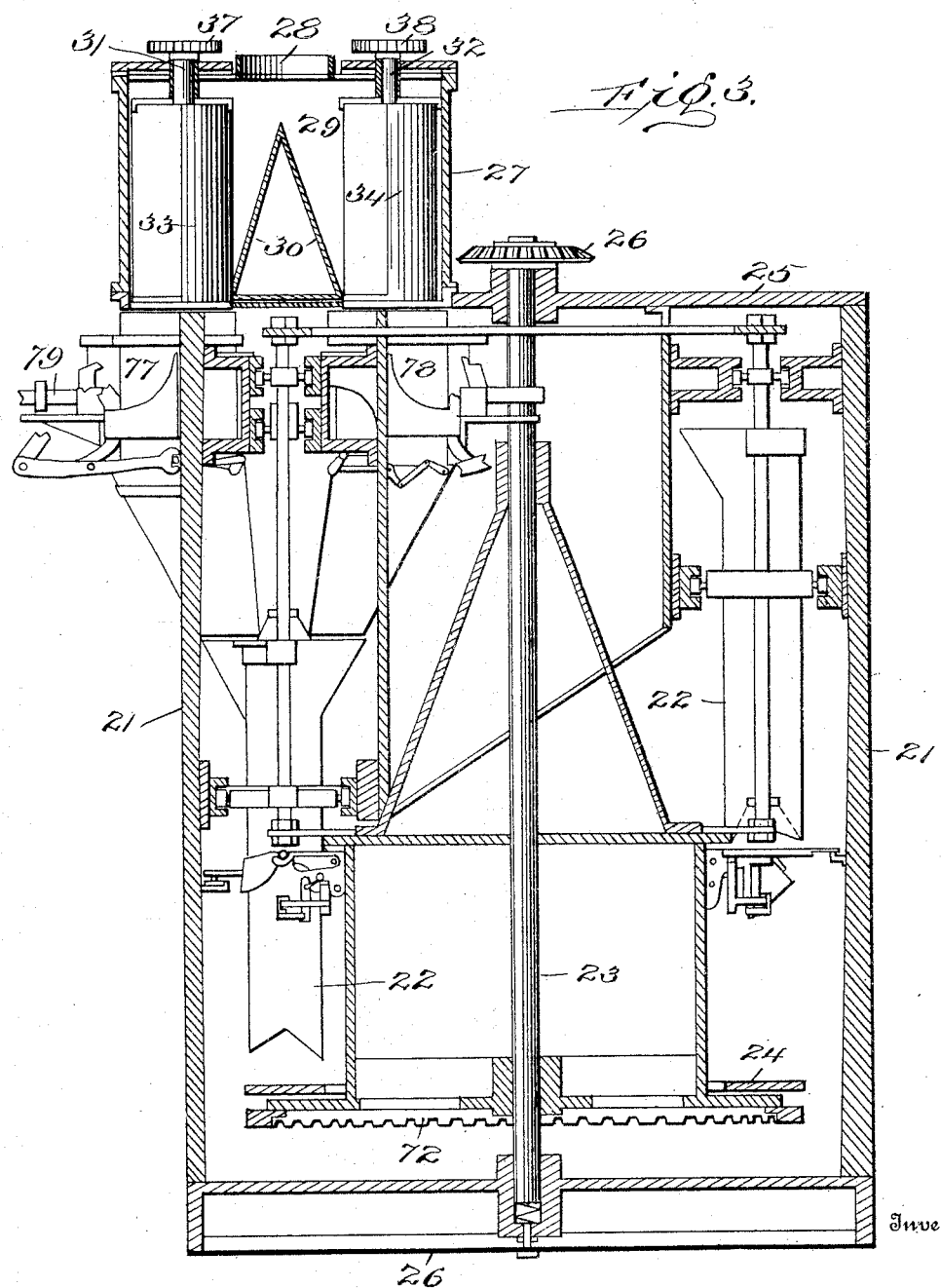

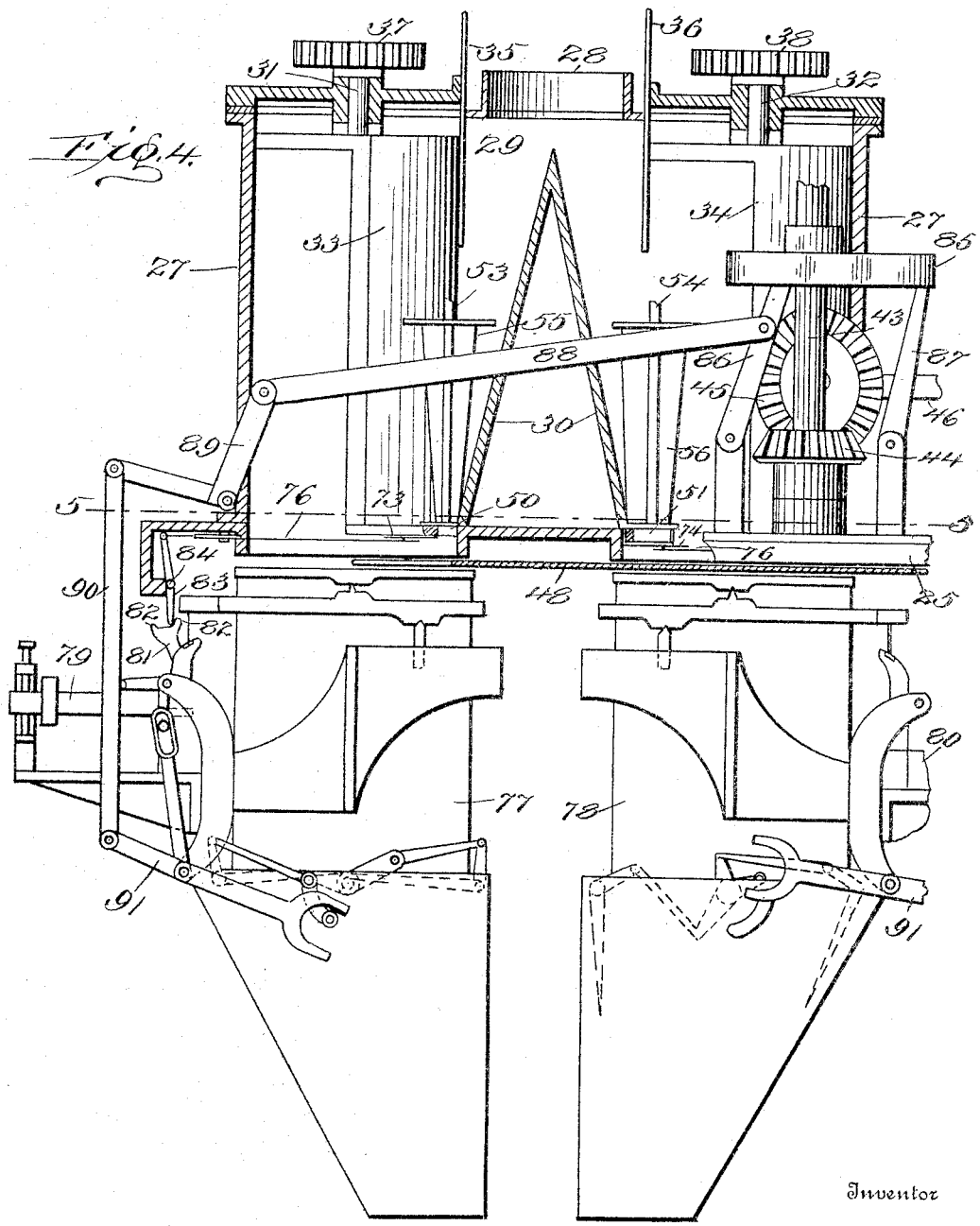

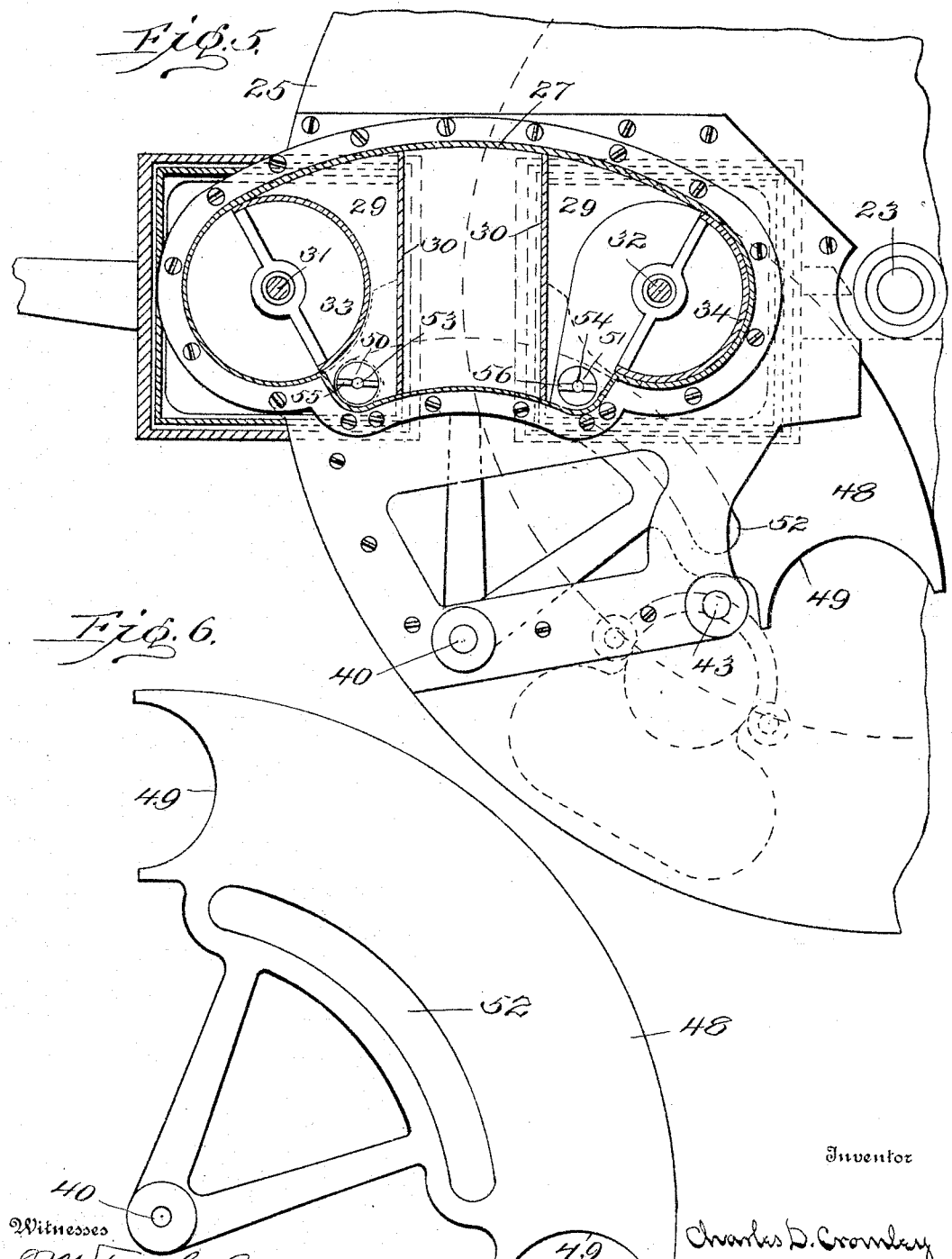

CHARLES D. CROMLEY, OF ALAMEDA, CALIFORNIA, ASSIGNOR TO AUTOMATIC PACKING COMPANY, OF SAN FRANCISCO, CALIFORNIA, A CORPORATION OF CALIFORNIA.

GRAIN-MEASURING MACHINE.

948,290.  Specification of Letters Patent.  Patented Feb. 1, 1910.

Original application filed November 30, 1906, Serial No. 345,763. Divided and this application filed October 26, 1907. Serial No. 389,341.

*To all whom it may concern:*

Be it known that I, CHARLES D. CROMLEY, a citizen of the United States, residing at Alameda, in the county of Alameda and State of California, have invented certain new and useful Improvements in Grain-Measuring Machines; and I do hereby declare the following to be a full, clear, and exact description of the invention, such as will enable others skilled in the art to which it appertains to make and use the same.

This invention relates to measuring devices and especially to measuring apparatuses adapted for use in connection with weighing and bagging machines.

An object of the present invention is to provide a measuring machine adapted to deliver a large percentage of a predetermined weight of material to a receptacle at a single discharge and to continue to discharge a small amount of material until the exact predetermined weight has been obtained.

A further object of the invention is to provide in a machine of the class described a casing adapted to receive material from any approved source and with means disposed within the casing adapted to separate from the material contained in the casing a quantity of the material which is discharged below the casing at a single discharge and with an auxiliary opening formed in the casing adapted to discharge material in small quantities until the exact predetermined weight has been obtained, and with means for interrupting the flow when such weight has been discharged.

A further object of the invention is to provide in a device of the class described a casing having openings formed in the bottom thereof and with semi-cylinders disposed within the casing and mounted to rotate adapted to discharge through the opening in the bottom of the casing the amount of material admitted into the semi-cylinders from any approved source.

With these and other objects in view, the invention comprises certain novel constructions, combinations and arrangements of parts, as will be hereinafter fully described and claimed.

In the drawings:—Figure 1 is a view in side elevation of an entire organized machine of which the present measuring device forms part. Fig. 2 is a top plan view of the machine shown at Fig. 1 showing the means for operating the measuring device. Fig. 3 is a vertical, diametrical, sectional view of the machine as taken on line 3—3 of Fig. 2. Fig. 4 is an enlarged, detail view of the measuring apparatus taken substantially on the same plane as that of Fig. 3. Fig. 5 is a transverse, sectional view taken on a horizontal plane as on the line 5—5 of Fig. 4. Fig. 6 is a detail plan view of the segmental plate adapted to close the bottoms of the casing. Fig. 7 is a detail view of the auxiliary discharge and means for controlling the same taken on a plane substantially the same as the plane of Fig. 4.

Like characters of reference indicate corresponding parts throughout the several views.

The measuring device forming the subject-matter of this application is adapted for operation in association with a weighing and bagging machine as disclosed in co-pending application No. 379,550, filed June 18, 1907, for a measuring and weighing device, and of which application this is a division, and which said application was, in turn, a division of co-pending application No. 345,763, filed Nov. 30, 1906, for a bagging machine so that this application is a division of the last-mentioned application No. 345,763.

The bagging machine mentioned and disclosed in the co-pending applications, is shown as comprising a base 20 upon which are erected the uprights 21. Filling tubes 22 are mounted to rotate upon the base by means of a central shaft 23 with a rotating table 24 carrying the said filling tubes, as described in the said co-pending applications. Upon the upper ends of the uprights 20 a top member, plate or spider 25 is mounted forming a journal for the upper end of the shaft 23, which said shaft is provided with a gear 26 disposed above the spider. Upon the top plate or spider a casing 27 is erected of any approved shape, but here shown and preferably somewhat in the form of an ellipse with its opposite ends formed semi-cylindrical and provided with an opening 28 through which material may be discharged into the chamber 29 of the casing within which a deflector or baffle plate 30 is erected preferably in the form of an inverted V.

Within the opposite semi-cylindrical ends of the casing shafts 31 and 32 are journaled in a vertical position and with semi-cylinders 33 and 34 carried, respectively, thereby, conforming substantially to the inner curvature of the semi-cylindrical ends of the casing. Between the chamber 29 and the chambers occupied by the semi-cylinders 33 and 34 plates 35 and 36 are mounted to be moved vertically to regulate the amount of material which may flow from the chamber 29 to the semi-cylinders to an approximate degree. It will, of course, be understood that as the plates 35 and 36 are raised a greater interval is provided below their lower ends permitting thereby a greater quantity of material to flow from the chamber 29 to the curved chambers occupied by the semi-cylinders 33 and 34.

Upon the upper ends of the shafts 31 and 32 gears 37 and 38 are, respectively, provided, and a segmental gear 39 is journaled upon a shaft 40 mounted vertically upon the top plate. The segmental gear 39 intergears with and is adapted to rotate the gears 37 and 38 and is itself moved by means of a crank arm 41 provided with a roller 41′ engaging a cam 42 carried upon the upper end of a shaft 43 journaled vertically upon the top plate or spider 25. The shaft 43 is provided with a gear 44 intergeared with a gear 45 carried upon a horizontal shaft 46, which latter shaft is provided with a gear 47 intergeared with the gear 26 carried upon the upper end of the shaft 23, and from which the parts receive motion.

The bottom of the casing 27 is open, and a segmental plate 48 is mounted upon the shaft 40 and positioned to pass beneath the open bottoms of the semi-cylindrical end chambers and to be moved about the said shaft 40 as a pivot simultaneously with the movement of the segmental gear 39, so that with the plate provided with curved or concaved end recesses 49, the semi-cylindrical chambers are alternately opened and closed. From an examination of Figs. 2 and 5 it will be seen that the semi-cylinder 33 is positioned to prevent the passage of material from the chamber 29 into the semi-cylindrical chamber and that the segmental plate 48 is moved to open the open lower end of the semi-cylindrical casing inclosing the semi-cylinder 33 and to close the chamber inclosing the semi-cylinder 34. With the gears 39 and the segmental plate 48 moved to reverse the relative positions of the semi-cylinders 33 and 34, the segmental plate 48 is also moved to close the opening beneath the semi-cylinder 33 and to open the bottom of the casing beneath the semi-cylinder 33.

In addition to the openings above-described auxiliary openings 50 and 51 are provided through the bottom of the casing 27 and registering at all times with a segmental slot 52 formed through the segmental plate 48 so that the said openings may, unless otherwise closed, discharge at all times through the said slot.

Above the openings 50 and 51 shafts 53 and 54 are journaled vertically provided with wings or agitators 55 and 56 adapted, when rotated, to agitate the material and insure a constant flow through the openings 50 and 51, unless such openings are interrupted. The upper ends of the shaft 53 and 54 are provided with gears 57 intergeared with gears 58 carried upon a shaft 59 journaled horizontally above the top plate or spider 25. The shaft 59 carries a gear 60 intergeared with a gear 61 carried upon a shaft 62 also horizontally journaled above the top plate 25 but substantially at right angles to the shaft 59. The shaft 62 carries a gear 63 intergeared with a gear 64, carried upon the upper end of a vertical shaft 65 extending vertically downward and intergeared by means of the gear 66 with the shaft 67 by means of which latter shaft power is applied to the machine as at the fast and loose pulley 68. From the shaft 67 power is applied to move the machine by means of gears 68, operating shaft 69, which, in turn, intergears by means of the gears 70 with the shaft 71, which, in turn, is intergeared with the gear or rack 72 encircling and rigidly connected with the central shaft 23.

Beneath the openings 50 and 51 closure plates 73 and 74 are mounted to close the openings in any approved manner as by being slidably mounted in the groove 75 and controlled by means of a rod 76, the detail of such parts being shown in enlarged section at Fig. 7.

Beneath the casing 27 scale pans 77 and 78 are mounted positioned to receive discharge from the open lower ends of the semi-cylindrical casings, and connected with the said scale pans are beams 79 and 80 provided with upstanding arms 81. The upstanding arms 81 are provided with spaced stops 82 engaging the lower end of the lever 83 fulcrumed as at 84 and with its upper end connected with the rod 76 and by which the closure 73 is operated in the manner described in the parent applications Nos. 345763 and 379550.

Upon the shaft 43 is mounted a cam disk 85 operating by means of levers 86 and 87 and through links 88, bell crank lever 89, link 90 and lever 91 to dump the scale pans, as described in the said parent applications.

In operation bags are placed on the filling tubes 22 and rotate upon and with the table 24. As the filling tubes pass beneath the scale pans 77 and 78, the said scale pans are dumped into the filling tubes, as described in the co-pending applications above referred to, and which said process forms no part of the present invention.

Material for filling the scale pans is supplied from any approved and convenient source through the openings 28 into the chamber 29 and by reason of the baffle plate 30 is guided laterally to fill the extreme semi-cylindrical chambers occupied, in turn, by the semi-cylinders 33 and 34. With the parts disposed as shown in Figs. 2 and 4, the passage into the semi-cylinder chamber occupied by the semi-cylinder 33 is closed by the semi-cylinder itself, while the passage upon the other end is open by reason of the semi-cylinder occupying the position opposite the opening. The plates 35 and 36 are so regulated that a very large percentage of the material to be measured passes thereunder into the concave interior of the semi-cylinder, which, as shown, is the semi-cylinder 34. When the parts are reversed by moving the segmental gear 39 the semi-cylinder 34 rotates to close the passage, while the semi-cylinder 33 rotates to open the passage to its chamber. As the semi-cylinder 34 rotates the segmental plate 48 moves to open the bottom of the chamber beneath the semi-cylinder 34 so that the material contained therein and moved thereby is discharged through the open bottom into the scale pan 78 beneath. In practice, it is found that a very large percentage, as 90 or 95 per cent. of the material, can be discharged almost instantaneously by the process and mechanism just described, and to supply the remaining small portion the openings 50 or 51 are opened by the movement of the plate 73 so that an auxiliary stream is discharged through said openings, such flow being insured by the movement of the agitators 55 and 56. As soon as the exact amount has been discharged through the auxiliary openings the scale pan is moved by the weight of the contained material to thereby close the auxiliary openings and prevent further flow, so that the exact weight of material is in each instance accurately controlled by the discharging and measuring mechanism, which forms the subject of this application.

It will be noted that two of the semi-cylinders and associate scale pans are employed, positioned to discharge alternately into the filling tubes 22, so that as one semi-cylinder is discharging the other is filling, and as that one is discharged its companion again fills so that the operation of filling and discharging is practically continuous, as the filling tubes rotate beneath the scale pans to receive discharge of material therefrom.

What I claim is:—

1. In a device of the class described, a casing, a semi-cylinder mounted within the casing, means to rotate the semi-cylinder, and means to fill the semi-cylinder at one position and discharge it at another position.

2. In a device of the class described, a casing, a semi-cylinder mounted within the casing, means to regulate the flow of material into the semi-cylinder, means to rotate the semi-cylinder, and means to fill the semi-cylinder at one position and discharge it at another position.

3. In a device of the class described, a casing, a semi-cylinder mounted at one end of the casing, means to admit material to the opposite end of the casing, means to regulate the passage of material from one end to the other of the casing, means to rotate the semi-cylinder, and means permitting the filling of the semi-cylinder at one position and its discharge at another position.

4. In a device of the class described, a casing, a semi-cylinder mounted within the casing, means to admit material to the casing, means to rotate the semi-cylinder to separate approximately a predetermined quantity of material from the material remaining in the chamber, and means to discharge the quantity of material separated.

5. In a device of the class described, a casing, a semi-cylinder mounted within the casing, an opening formed below the semi-cylinder, means to rotate the semi-cylinder to separate a quantity of material from the material approximating the predetermined weight within the casing, and to discharge it through the opening, and an auxiliary means adapted to add the requisite complement.

6. In a device of the class described, a casing, means to discharge a quantity approximating the predetermined weight of material from the casing at a single discharge, and an auxiliary means adapted to add the requisite complement.

7. In a device of the class described, a casing, a vertically disposed semi-cylinder journaled within the casing, means to feed material to the semi-cylinder, means to rotate the semi-cylinder, means to close the opening at the lower side of the casing, and means to remove the closure to permit the discharge of material from the semi-cylinder.

8. In a device of the class described, a casing, a vertically disposed semi-cylinder journaled within the casing, means to feed material to the semi-cylinder, means to regulate the amount of material fed to the semi-cylinder, and means to discharge material from the semi-cylinder to the lower sides of the casing.

9. In a device of the class described, a casing, a vertically disposed semi-cylinder, journaled within the casing, a feed opening, a slide arranged to close a predetermined portion of the feed opening, and means to discharge material from the bottom of the semi-cylinder.

10. In a device of the class described, a casing, a vertically disposed semi-cylinder journaled within the casing, a feed chamber disposed adjacent the periphery of the semi-cylinder, a slide arranged to close a predetermined portion of the opening between the chamber of the semi-cylinder, and means to discharge material from the bottom of the semi-cylinder.

11. In a device of the class described, a casing provided with semi-cylindrical ends, semi-cylinders mounted to rotate upon a vertical axis within the semi-cylindrical ends of the casing, means to discharge material into the casing, means to move the semi-cylinders rotatably to alternately discharge one and fill the other.

12. In a device of the class described, a casing provided with substantially semi-cylindrical ends, semi-cylinders mounted to rotate within the semi-cylindrical ends upon vertical axes, a shaft mounted adjacent the casing, a segmental gear carried by the shaft adapted to move the semi-cylinders rotatably, and a segmental plate carried by the shaft adapted to alternately open and close opposite ends of the casing.

13. In a device of the class described, a casing, means within the casing adapted to discharge approximately a predetermined quantity of material, and with auxiliary openings formed in the bottom of the casing, and agitators mounted within the casing adjacent to and adapted to control the flow of material through the auxiliary openings.

14. In a device of the class described, a casing, semi-cylinders mounted within the casing upon vertical shafts extending upwardly without the casing, a shaft mounted adjacent the casing, and provided with a segmental gear adapted to operate the semi-cylinders, a second shaft mounted adjacent the last-mentioned shaft, a cam disk carried by the last-mentioned shaft and adapted to move the segmental gear alternately in reverse directions, and means to rotate the cam disk.

15. In a device of the class described, a casing provided with openings in the bottom, means within the casing to discharge a quantity of material through some of said openings of approximately the predetermined weight, means to close the said openings, a receptacle disposed beneath the openings adapted to receive material therefrom, and means to discharge a weight completing stream of material through others of the openings in said casing.

In testimony whereof I affix my signature in presence of two witnesses.

CHARLES D. CROMLEY.

Witnesses:
H. W. THOMAS,
CHAS. H. PINNER.